United States Patent

[11] 3,582,029

| [72] | Inventor | Henry E. Moesta<br>Whitehall, Pa. |
|---|---|---|
| [21] | Appl. No. | 814,742 |
| [22] | Filed | Apr. 9, 1969 |
| [45] | Patented | June 1, 1971 |
| [73] | Assignee | Ramcor, Inc.<br>Pittsburgh, Pa. |

[54] CLAMP APPARATUS
7 Claims, 5 Drawing Figs.

[52] U.S. Cl. ................................. 248/68,
248/300
[51] Int. Cl. .................................. F16l 3/22
[50] Field of Search .......................... 248/68
(CB), 68, 74; 174/157

[56] References Cited
UNITED STATES PATENTS

| 3,216,683 | 11/1965 | Girard | 248/6B |
| 3,397,431 | 8/1968 | Walker | 248/68X |
| 3,464,661 | 9/1969 | Alesi | 248/68 |

Primary Examiner—Chancellor E. Harris
Attorney—Buell, Blenko & Ziesenheim

ABSTRACT: Unitary members from which clamp apparatus for tubes and the like are assemblied. Each unitary member has rounded edge portions to seat a flexible grommet or a pipe, tube or the like, and can be interlocked end to end with a like unitary member to support a parallel array of pipes, tubes and the like. A weld nut may be fastened in each unitary member to enable an assembled clamp apparatus to be flush mounted on a support.

PATENTED JUN 1 1971

INVENTOR
HENRY E. MOESTA
By
*Buell, Blake & Eisenbein*
Attorneys

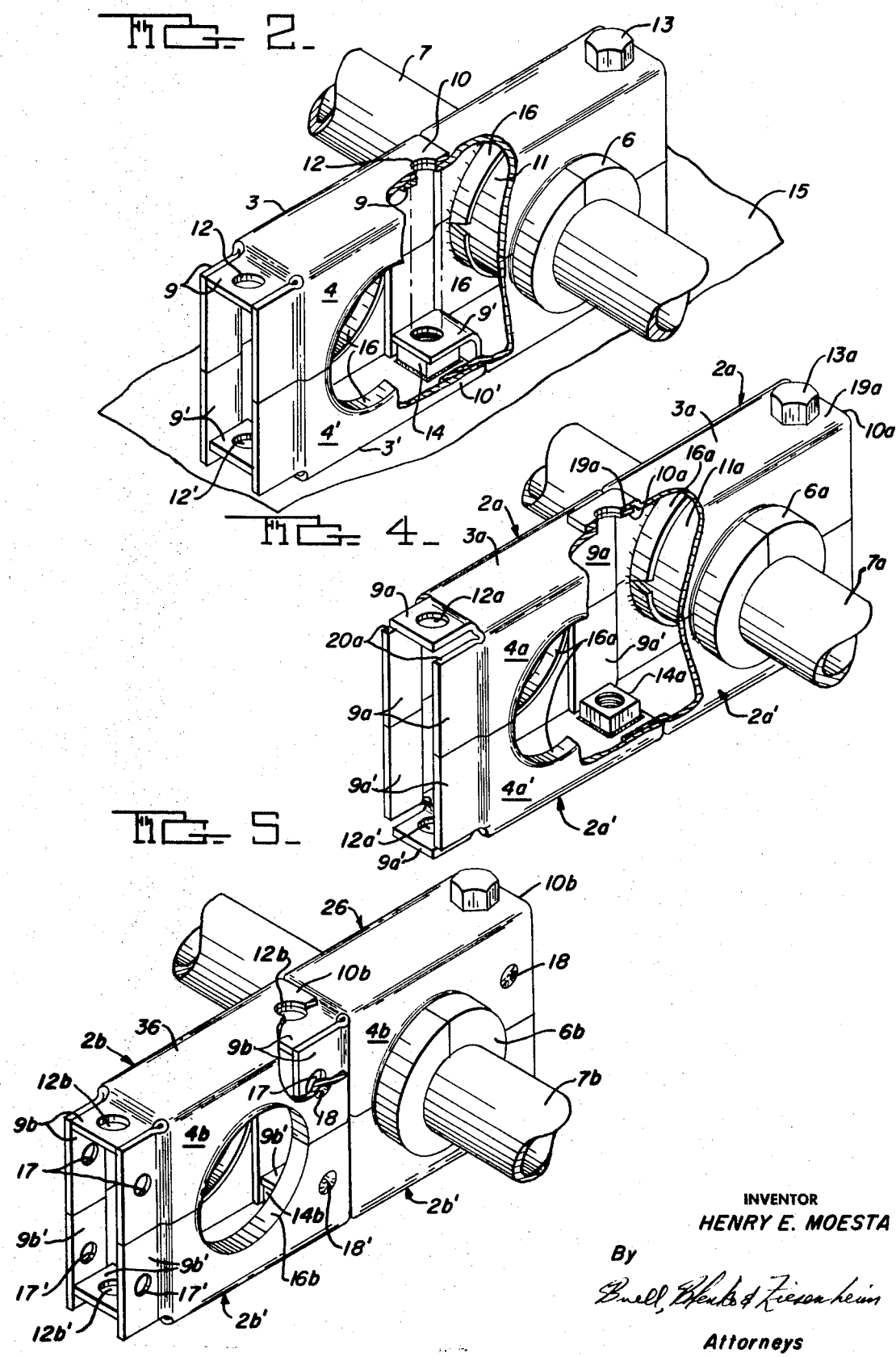

CLAMP APPARATUS

This invention relates to clamps which are used to support and position tubes and pipes. It is particularly useful in providing a clamp apparatus which is simple and inexpensive to fabricate and which provides ease and versatility in mounting and remounting.

The use of clamp apparatus to clamp tubes, pipes and the like is broadly old and well known. It provides a means for attaching pipes to a fixed support and for attaching pipes together to support each other. Each installation of a piping system and each revision of a piping system presents unique circumstances for which special clamping apparatus is needed. The sizes of pipes, spacings of pipes and sequences of pipe sizes encountered in the field, and the need for clamp apparatus to accommodate the installation of additional pipes, are impossible to predict.

Many proposals have heretofore been made for prefabricated clamp apparatus in an effort to obtain a clamp apparatus that was inexpensive to manufacture and yet versatile in the field. One approach was to fabricate channels with a series of circular recesses along the length, to cut off desired lengths of such prefabricated channel in the field and to place suitable grommets round the pipes so that different pipe sizes could be seated into the recesses between two abutting lengths. Although this proposal has been used commercially, it is unsatisfactory for many purposes because special shearing equipment is usually needed in the field for efficient installation and it usually requires the fabrication of an entirely new clamp apparatus each time a revision is needed in the piping system.

A different and more versatile approach was to fabricate unit structures which could be attached together end to end in a series, having units with different sized rounded recesses to accommodate different size tubes and pipes. This proposal was heretofore commercially impractical because (i) such unit structures were difficult and expensive to make and handle, (ii) large inventories of unit pieces, to accommodate different sizes of pipe or tube, had to be made available in the field, (iii) the clamp apparatus required separate assembling pipe by pipe, and (iv) such structures were difficult and cumbersome to manufacture and to mount on supports.

The present invention overcomes these disadvantages and impracticalities and makes unitary construction of prefabricated clamp apparatus commercially feasible.

I provide unitary members from which clamping apparatus can be assembled, each unitary member having substantially the same shape and dimensions. Each unitary member has a base part and two support parts, the support parts being positioned in substantially parallel planes. Each support part has rounded, preferably semicircular, edge portions capable of seating a flexible grommet or a pipe, tube or the like. Each support part preferably has substantially flat edge portions capable of abutting with a like flat edge portions of a like adjacent unitary member and thereby eliminate the need for separate spacers between unitary members to assemble the clamp apparatus. Each base part and each support part has an offset joint portion capable of receiving a corresponding end portion of a like adjacent unitary member so that unitary members can be interlocked together end to end, preferably semirigidly. In this way, large clamp apparatus or extensions of existing clamp apparatus can be rapidly assembled in the field and without the need for separately assembling the clamp apparatus pipe by pipe. For efficient fabrication and assembly, I prefer that the offset joint portions of the support parts be tapered toward the base part within close tolerances to provide for interlocking of the unitary members.

The unitary members can be abutted and rigidly fastened together to form the clamp apparatus in any suitable manner. It is preferred, however, that a bolt hole be positioned in the offset joint portion of each base part and that a bolt hole be positioned in the end portion of each base part, so that, when two unitary members are interlocked together end to end, the bolt hole in the end portion of the base part is superimposed over the bolt hole in the offset joint portion of the base part of the like adjacent unitary member. The clamp apparatus thereafter is fastened together by bolts inserted through the bolt holes to rigidly fasten abutting unitary members positioned around a pipe, tube or the like as well as to rigidly fasten adjacent unitary members. In addition, like clamp apparatus can be fastened base part to base part by bolts inserted through the bolt holes.

To permit clamp apparatus to be mounted flush on a support without drilling a large number of holes in the support, I prefer that in certain unitary members, a weld nut be fastened, preferably by welding, concentrically over the bolt hole in the end portion of the base part between the support parts, and that said unitary members have an additional offset in the offset joint portion of the base part to permit the offset joint portion of the base part to be superimposed on the weld nut.

Other details, objects and advantages of my invention will become apparent as the following description of the presently preferred embodiments thereof proceeds.

In the accompanying drawings, I illustrate presently preferred embodiments of my invention in which:

FIG. 2 is a perspective view with portions broken away of a clamp apparatus employing unitary members and mounted flush to a support;

FIG. 4 is a perspective view with portions broken away of a clamp apparatus employing alternative unitary members; and FIG. 5 is a perspective view with portions broken away of a clamp apparatus employing second alternative unitary members.

Figure 1:
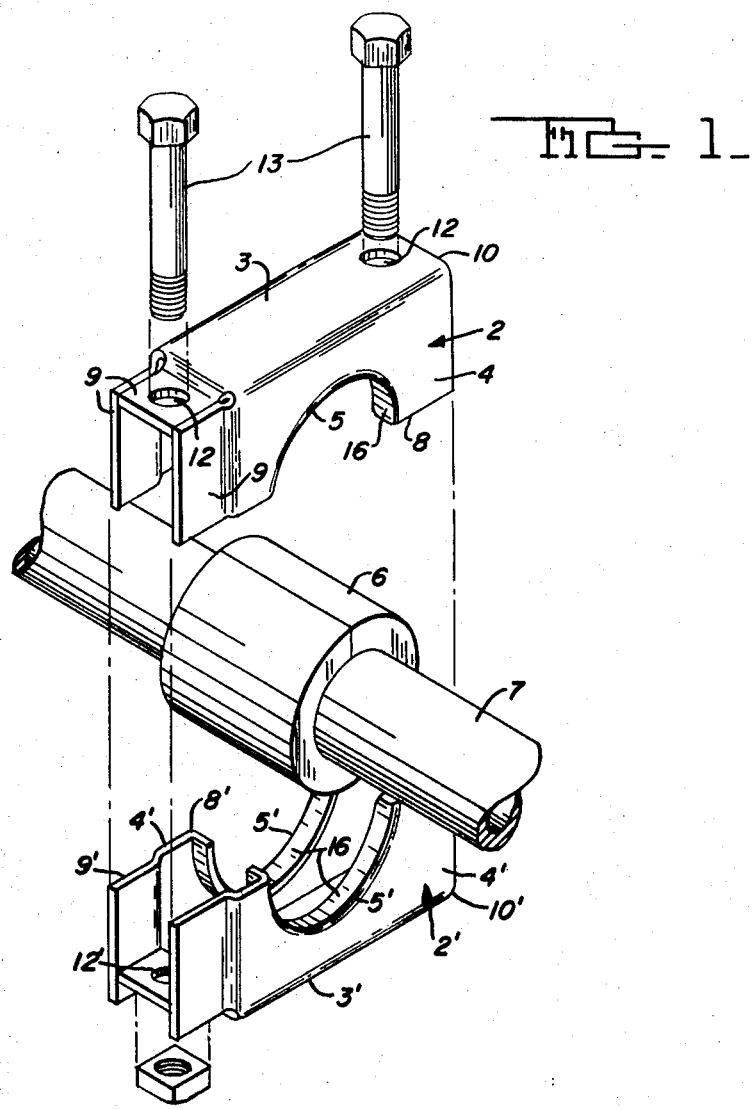
FIG. 1 is an exploded perspective view of a clamp apparatus employing unitary members.
Figure 3:
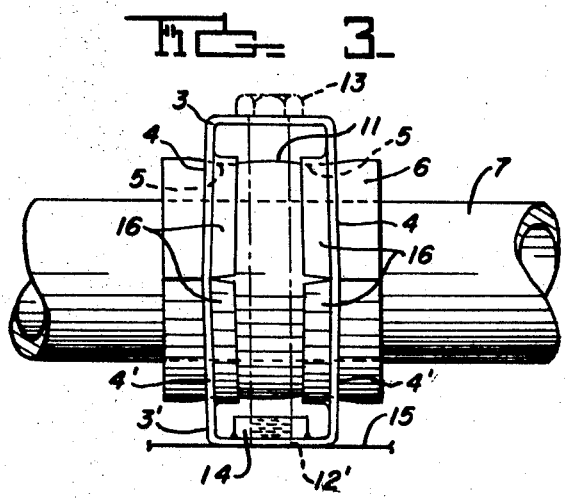
FIG. 3 is an end view of a clamp apparatus employing unitary members.

Referring specifically to the drawings, a clamp apparatus is composed of unitary members 2, each unitary member 2 having a base part 3 and two support parts 4; the support parts 4 positioned in substantially parallel planes. Each support part 4 has a semicircular edge portion 5 which seats a flexible grommet 6 positioned around pipe 7 and has flat edge portions 8 which abut with like flat edge portions 8' of a support part 4' of like opposing unitary member 2'. Each base part 3 and each support part 4 has an offset joint portion 9 capable of receiving an end portion 10 of base part 3 and each support part 4 of a like adjacent unitary member. Said joint portion 9 of each support part 4 is tapered toward the base part 3 so that the unitary member 2 can be semirigidly interlocked with end portions 10 of like adjacent unitary member. Bolt holes 12 are positioned in the offset joint portion 9 of the base part 3 and in the end portion 10 of the base part 3 so that, when like unitary members 2 and 2 are interlocked end to end, the bolt hole 12 in the end portion 10 of the base part 3 of unitary member 2 is superimposed over the bolt hole 12 in the offset joint portion 9 of the base part 3. The clamp apparatus is thereafter rigidly fastened together by bolts 13.

For flush mounting of the clamp apparatus on a support 15, a weld nut 14 is concentrically welded over the bolt hole 12' in the end portion 10' of the base part 3' and joint portions 9' of the base part 3' are further offset to adjust for the thickness of the weld nut 14. The bolt 13 can be inserted through bolt hole 12 and screwed into the weld nut 14 so that the clamp apparatus will expose a flat surface to the support 15.

I prefer that flange portion 16 be provided on each semicircular edge portion 5 so that the flexible grommet 6 is gripped by the unitary member 2 toward center portions but not necessarily at the center portion of the flexible grommet 6, and is gripped in the area between the support parts 4 but not at the center area between the support parts 4. The flexible grommet 6 is thereby compressed at points toward the center of the flexible grommet 6 and toward the center area between the support parts 4, and a bulged portion 11 is formed at the center portion of the flexible grommet 6 in the center area between the support parts 4. By this arrangement, the grommet 6 is rigidly seated in the unitary member 2 and cannot slide out of the clamp apparatus, even though the flexible grommet 6 may not be precisely centered relative to the unitary member 2.

In an alternative embodiment shown in FIG. 4, the clamp apparatus is the same save for the offset joint portion 9a of the base part 3a. The offset joint portion 9a of the base part 3a is offset so that it engages outside surfaces 19a of the end portion 10a of the base part 3a of a like adjacent unitary member 2a. By this arrangement, the end portion 10a of the base part 3a is fitted between the offset joint portion 9a and the edges 20a of the offset joint portions 9a of the support parts 4a, and thereby rigidly fasten the unitary members 2a and 2a together.

In a second alternative shown in FIG. 5, the clamping apparatus is the same save for the offset joint portions 9b of each support part 4b and the end portions 10b of each support part 4b. A hole 17 is provided in each offset joint portion 9b of each support part 4b and a dimple 18 is positioned in end portion 10b of each support part 4b so that, when the offset joint portions 9b of support parts 3b of a like adjacent unitary member 2b are received in the end portions 10b, the dimples 18 interlock in the holes 17 and thereby rigidly fasten the unitary members 2b and 2b together.

While I have shown and described certain present preferred embodiments and uses of the invention, it is to be distinctly understood that the invention is not limited thereto but may be otherwise variously embodied and used within the scope of the following claims.

I claim:

1. A unitary member used for assembling clamp apparatus to support tubes, pipes and the like which comprises a single base part, two support parts in substantially parallel planes and integral with said base part, each support part having a single rounded edge portion capable of seating a grommet, a pipe and the like, each base part and each support part having offset joint portions capable of interlocking with end portions of a like adjacent unitary member whereby said unitary members be fastened together end to end.

2. A unitary member used for assembling clamp apparatus to support tubes, pipes and the like as claimed in claim 1 wherein the offset joint portion of each support part is tapered to the base part whereby the offset joint portions can be interlocked with end portions of a like shaped unitary member.

3. A unitary member used for assembling clamp apparatus to support tubes, pipes and the like as claimed in claim 1 wherein each rounded edge portion of each support part has a flange part capable of gripping a flexible grommet toward center portions thereof, whereby upon assembly a bulged portion is formed at center portions of said flexible grommet between the support parts.

4. A unitary member used for assembling clamp apparatus to support tubes, pipes and the like as claimed in claim 1 wherein the rounded edge portions of the support parts are substantially semicircular and the support parts have flat edge portions capable of abutting with like flat edge portions of like support parts of a like opposing unitary member.

5. A unitary member used for assembling clamp apparatus to support tubes, pipes and the like as claimed in claim 1 wherein holes are provided in the offset joint portions of the base part and said end portions of the base part so that the hole is an offset joint portion of the base part is concentrically superpositioned on the hole is said end portion of an adjacent unitary member when the unitary members are interlocked, whereby the unitary members can be bolted together to form the clamp apparatus.

6. A unitary member used for assembling clamp apparatus to support tubes, pipes and the like as claimed in claim 5 wherein a weld nut is concentrically fastened over a hole in said end portion of a base part of the unitary member whereby the bolt can be received into the weld nut and can be an assembled clamp apparatus flush mounted to a support.

7. A unitary member used for assembling clamp apparatus to support tubes, pipes and the like as claimed in claim 1 wherein a hole is provided in each offset joint portion of each support part and a dimple is provided in end portions of each support part, whereby upon assembly, the dimples in said end portions of the support parts are seated in the holes in the offset joint portions of the support as parts of a like adjacent unitary member.